United States Patent [19]

Ruch

[11] 4,046,282

[45] Sept. 6, 1977

[54] MOLDED PLASTIC COVERS FOR CONTAINERS

[75] Inventor: Heinz Ruch, Basel, Switzerland

[73] Assignee: Albert Obrist & Co., Basel, Switzerland

[21] Appl. No.: 737,799

[22] Filed: Nov. 2, 1976

Related U.S. Application Data

[62] Division of Ser. No. 591,102, June 27, 1975, Pat. No. 4,005,101, which is a division of Ser. No. 349,256, April 9, 1973, Pat. No. 3,915,613.

[51] Int. Cl.² .............................................. B65D 41/32
[52] U.S. Cl. .................................. 220/270; 220/306; 220/307; 215/256; 215/320
[58] Field of Search ............... 215/256, 320, 221, 354; 220/270, 276, 306, 307

[56] References Cited

U.S. PATENT DOCUMENTS

| | | | |
|---|---|---|---|
| 3,753,511 | 8/1973 | Ruch | 215/321 X |
| 3,856,171 | 12/1974 | Rossi | 215/256 |

Primary Examiner—George T. Hall
Attorney, Agent, or Firm—Edward J. Brenner

[57] ABSTRACT

A method for molding plastic covers for containers wherein the molding apparatus includes a stationary die section, including a fixed die member having a molding surface shaped to form a portion for the mold corresponding to the outer surface of the side of the cover, a movable die section including a plurality of movable die members, at least one of the movable die members being slidingly engaged within said stationary die member, a means for moving the plurality of movable die members in an axial direction between the closed and open positions of the molding apparatus, and a means for controlling the disengagement of the individual die members from the molded plastic cover whereby the fixed die member is first disengaged prior to the plurality of movable die members being sequentially disengaged from the cover. The plastic cover is adapted to cover an open-mouthed container which has a circumferentially extending projection on its outer wall in the region of the top edge thereof, wherein the cover has an inverted U-shaped rim in the form of a pair of upstanding circumferential sidewalls and a depressed central portion, the inner sidewall of the cover having a circumferential extending bulged portion and an inwardly extending gripping flap, the inner surface of the outer sidewall of the cover having a circumferential recess shaped to engage the projection on the container and to form a circumferential weakening line which subdivides the cover into a first cover member reusable as a cover and a second cover member being a tear-off portion, the outer surface of the outer sidewall being substantially straightline in cross-section and preferably tapered from top to bottom.

10 Claims, 8 Drawing Figures

U.S. Patent  Sept. 6, 1977  Sheet 1 of 6  4,046,282
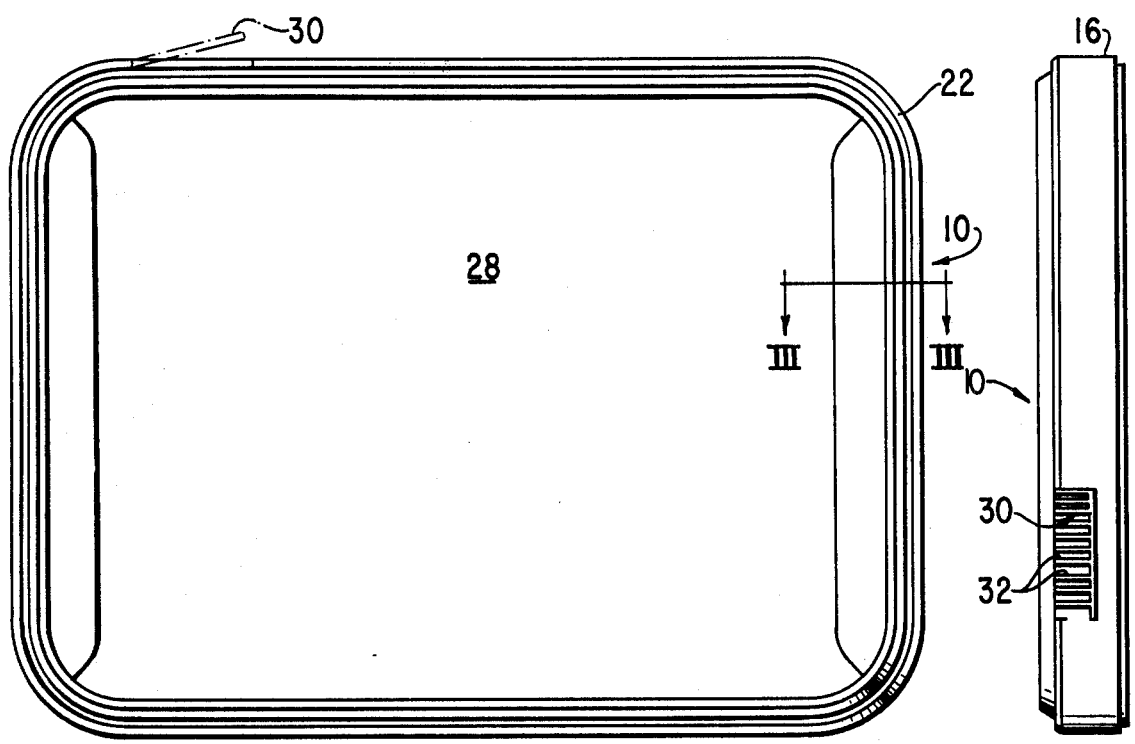
FIG. 1
FIG. 2
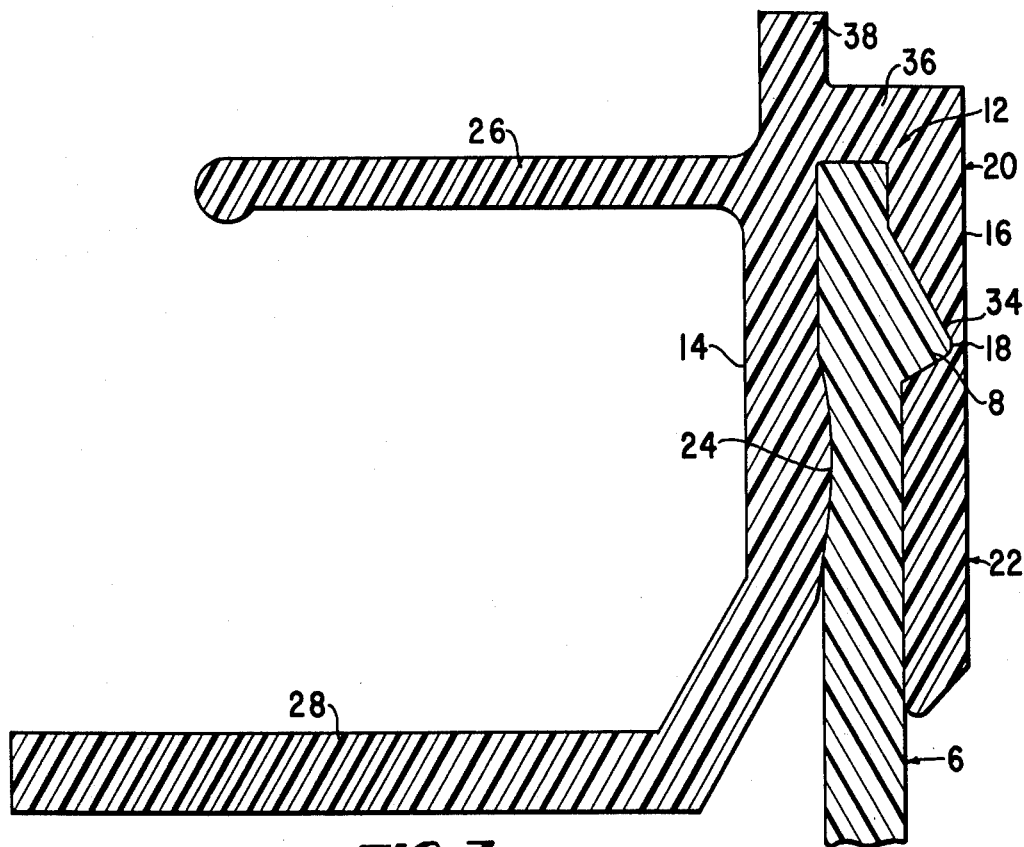
FIG. 3

MOLDED PLASTIC COVERS FOR CONTAINERS

REFERENCE TO RELATED APPLICATIONS

This application is a division of my copending application Ser. No. 591,102, filed June 27, 1975, now U.S. Pat. No. 4,005,101, which in turn is a division of Ser. No. 349,256, filed Apr. 9, 1973 now U.S. Pat. No. 3,915,613. The present application also relates to Disclosure Document No. 01538 filed on Dec. 12, 1972.

BACKGROUND OF THE INVENTION

1. Field of the Invention

The present invention relates to a process for molding plastic articles and more particularly relates to a process for molding plastic covers for containers and to the plastic covers so produced.

2. Description of the Prior Art

In my U.S. Pat. No. 3,753,511, there is disclosed a container and enclosure or cover therefor which has a number of distinct advantages. For example, with this particular container and cover the use of separate sealing means such as sealing foils for obtaining an airtight seal is not required. Also, with a relatively small total height of the cover member, and considerable production tolerances, a vigorous clamping and pressure effect can be realized so that a sealing action may be obtained which suffices for all practical requirements. This is particularly important to withstand any rough handling, such as my occur during transportation or manipulation of the containers, for example, in self-service stores.

The container and enclosure or cover therefor disclosed in U.S. Pat. No. 3,753,511 comprises an open-top or open-mouthed container having a top wall wall provided with a circumferential shoulder close to the upper end of the wall and a push-in cover member having a circumferential raised rim portion provided with a circumferential skirt member depending externally over the container wall. The skirt member has its inner wall surface provided with a projection which engages underneath the shoulder on the container wall when the cover member is pushed over the open top of the container. A circumferential notch on the outer side of the skirt member provides a weakening line making it possible to tear off a lower portion of the skirt member including the projection when the container is to be opened but leaving the remaining cover member intact to be reusable for closing the container. The cover has a bulged portion on the outer surface of the inner wall, and there is a shaped contoured fit between the container and the cover.

While the aforementioned cover and container have great advantages for packaging various materials, the method of manufacturing the cover in particular has been relatively speaking, complicated and expensive. This has been due particularly to the fact that it was not possible to use a simplified die tool design in which the various elements could be moved in an axial direction only. More particularly, in the previous design, at least one die which was split radially had to be opened in a radial direction. This resulted in a number of disadvantages. The surfaces which sealed, moved against each other causing wear and a decrease of sealing ability with the result that the dies subject to radial opening movement had to be replaced more frequently than dies performing axial movement only. Also, due to the split in the radial direction, additional seams appeared on the molded product. Furthermore, in addition to the control elements employed with the axial-moving dies, special and different control elements had to be employed for controlling the radially opening dies.

There are, of course, many different techniques known for molding various products, including plastic materials. For example, U.S. Pat. Nos. 3,193,884, 3,319,703, 3,344,942, 3,555,606, 3,584,356 and 3,687,591 are exemplary of such molding apparatus. However, the problem that the art faced prior to the present invention was how to design a container and cover therefor that had the aforementioned advantages while at the same time being able to manufacture the product, and particularly the cover, in a simple and inexpensive manner.

SUMMARY OF THE INVENTION

The present invention is concerned with an apparatus and method for molding a plastic cover for an open-mouthed container wherein the apparatus has a closed position for molding and an opened position for removing the molded plastic cover. This invention provides for the injection molding of plastic articles by the use of a mold formed from a cavity that has stationary sidewalls and a movable bottom together with a movable core. From the closed position, the mold is opened by having the cavity bottom and movable core move together axially to first disengage the molded article from the surfaces of the stationary sidewalls. Further axial movement separates the remaining mold members to release the molded article. The axial motion is then reversed in direction to return the apparatus to its closed mold position. For the production of molded plastic covers of the invention, the movable cavity bottom may have extensions so that it is in effect a core with respect to the stationary outer sidewalls of the cavity and is a cavity with respect to the movable elements forming the core mold. The apparatus comprises a stationary die section including means for injecting plastic into the mold for the plastic cover and a first die member having a molding surface shaped to form a portion of the mold corresponding to the outer surface of the outer sidewall of the cover, a movable die section including a plurality of die members, at least one of said plurality being slidably engaged in said first die member, each of the plurality of die members being movable in an axial direction in the molding apparatus with respect to the longitudinal axis of the cover, means for moving the plurality of movable die members in an axial direction between the open and closed positions of the molding apparatus and means for controlling the disengagement of the individual die members from the molded plastic cover whereby the first die member is disengaged initially from the plastic cover prior to the plurality of movable die members being disengaged sequentially from the plastic cover.

The present invention also is concerned with a molded plastic cover for an open-mouthed container having a circumferential extending projection on its outer wall in the region of the top edge thereof wherein the cover has an inward U-shaped rim in the form of a pair of upstanding circumferential sidewalls and a depressed central portion and wherein the inner sidewall of the cover has a circumferential outwardly extending bulged portion and inwardly extending gripping flap and the outer sidewall of the cover has a circumferential recess shaped to engage the projection of the container and to form a circumferential weakening line which divides the cover into a first cover member reusable as a cover and a second cover member being a tear-off portion, the outer surface of the outer sidewall being substantially straight line in cross-section and preferably being tapered inward from top to bottom.

It is an object of the present invention to provide a container and cover therefor which can be manufactured simply and inexpensively and yet will provide an effectively tight seal between the container and the cover.

It is a further object of the present invention to provide a molded plastic cover which can be manufactured simply and inexpensively and is adapted to provide a tight seal on a container.

It is a still further object of the present invention to provide an apparatus and method for manufacturing simply and inexpensively a molded plastic cover adapted to provide an effectively tight fit with a container designed therefor.

Other objects and advantages of the present invention will become apparent from the following description taken in conjunction with the accompanying drawings.

BRIEF DESCRIPTION OF THE DRAWINGS

FIG. 1 is a top plan view of a cover for a container constructed in accordance with the present invention;

FIG. 2 is a side elevational view of the molded plastic cover of the present invention shown in FIG. 1;

FIG. 3 is an enlarged cross-sectional view of a portion of the molded plastic cover of the present invention taken along the line III—III of FIG. 1 and of a portion of a container to which it is attached;

DESCRIPTION OF THE PREFERRED EMBODIMENT

Figure 4:
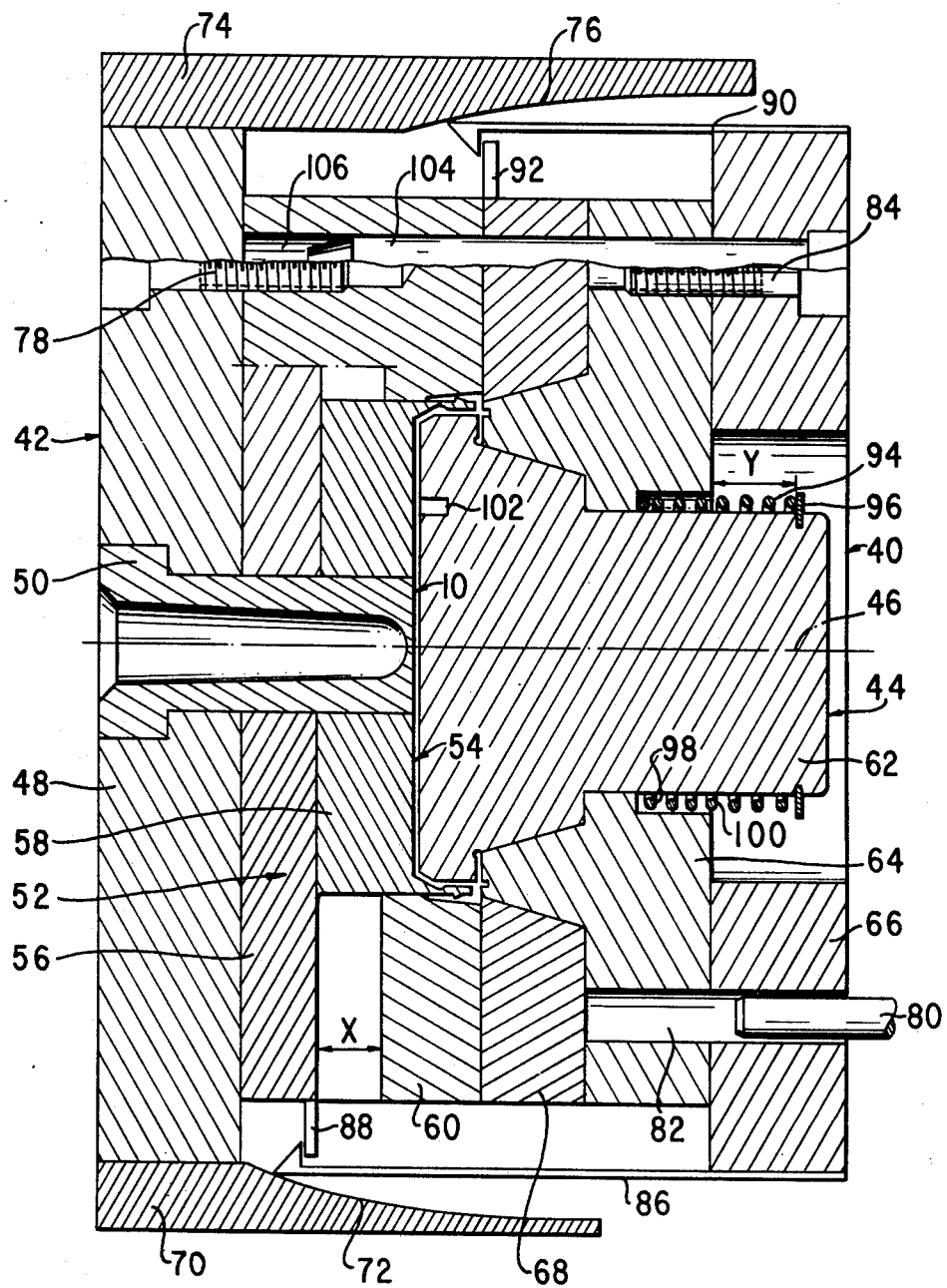
FIG. 4 is a schematic view in cross-section of a preferred embodiment of the molding apparatus of the present invention shown in its closed position.

FIGS. 1, 2 and 3 illustrate an open-mouthed container 6 having a circumferential extending projection 8 on its outer wall and a cover 10 therefor constructed in accordance with the present invention. The cover 10 includes an inverted U-shaped rim section 12 including a pair of upstanding circumferential sidewalls, namely, inner sidewall 14 and outer sidewall 16 which has a circumferential weakening line 18 which subdivides the cover 10 into a first cover member 20 reusable as a cover and a second cover member 22 being a tear-off portion. The inner sidewall 14 has a circumferential outwardly extending bulged portion 24 and an inwardly extending gripping flap 26.

The cover 10 includes a depressed central portion 28. The cover 10 also includes a pull tab 30 which is disposed in the same plane as outer sidewall 16. The pull tab 30 may be formed as a perforated section, the perforations being roughly rectangular in form and separated by a plurality of ribs 32 disposed in a plane perpendicular to the longitudinal axis of the cover 10. The outer sidewall 16 of cover 10 includes a circumferencial recess shaped to form the weakening line 18 and to engage the projection 8 of the container 6 for locking cover 10 to the container 6. The outer wall surface of outer sidewall 16 is substantially straight line in cross-section and preferably tapered slightly inwardly from top to bottom. The U-shaped rim section 12 includes a yoke 36 connecting together the inner sidewall 14 and outer sidewall 16; it also includes a circumferential upper rim 38 connected to yoke member 36. The cover 10 is constructed of a plastic material and is designed to be relatively flexible and resilient in structure. The container 6 is also preferably constructed of plastic and is designed to be relatively stiff in structure.

Figure 5:
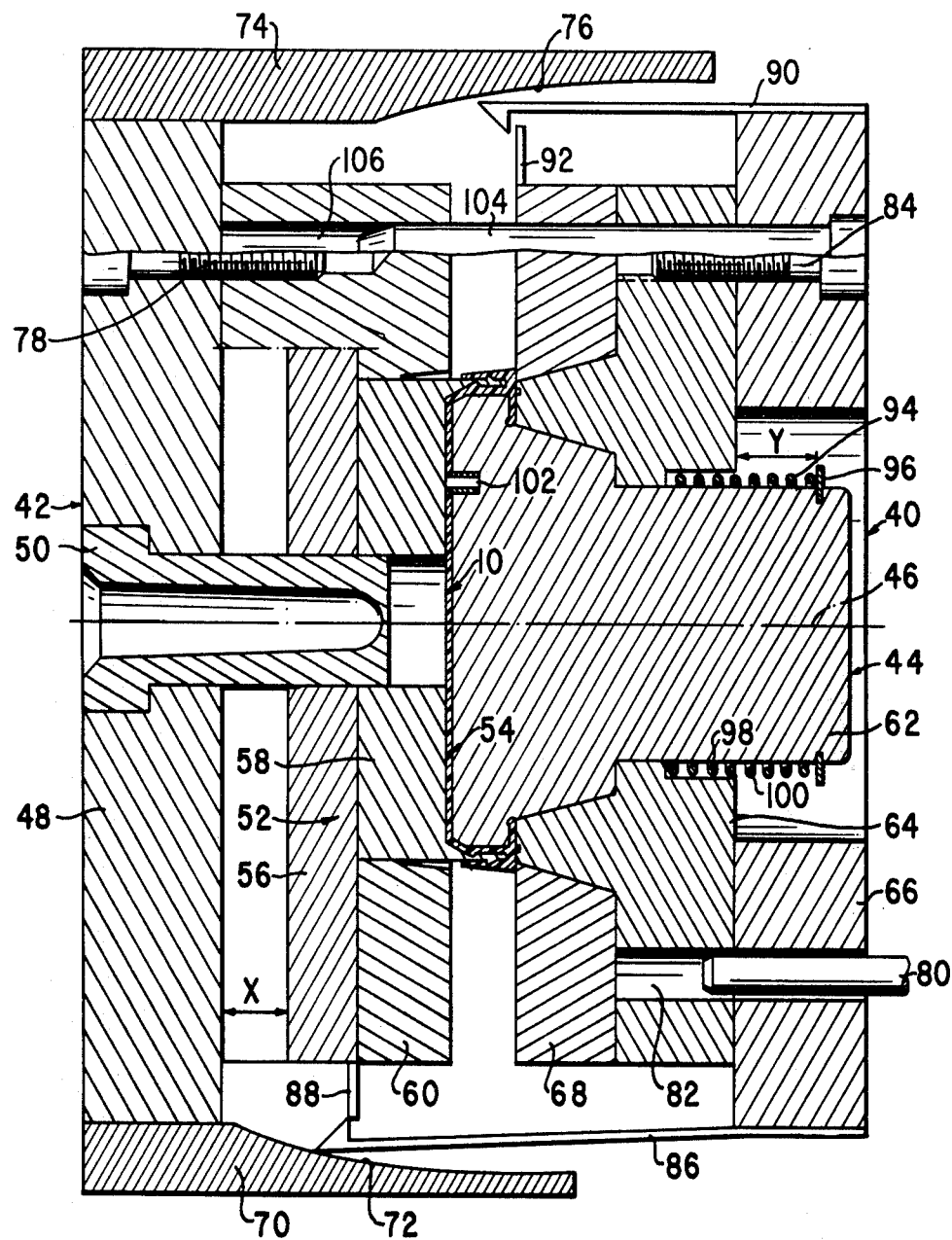
FIG. 5 is a schematic view in cross-section of the molding apparatus of FIG. 4 shown in a first partially opened position.
Figure 6:
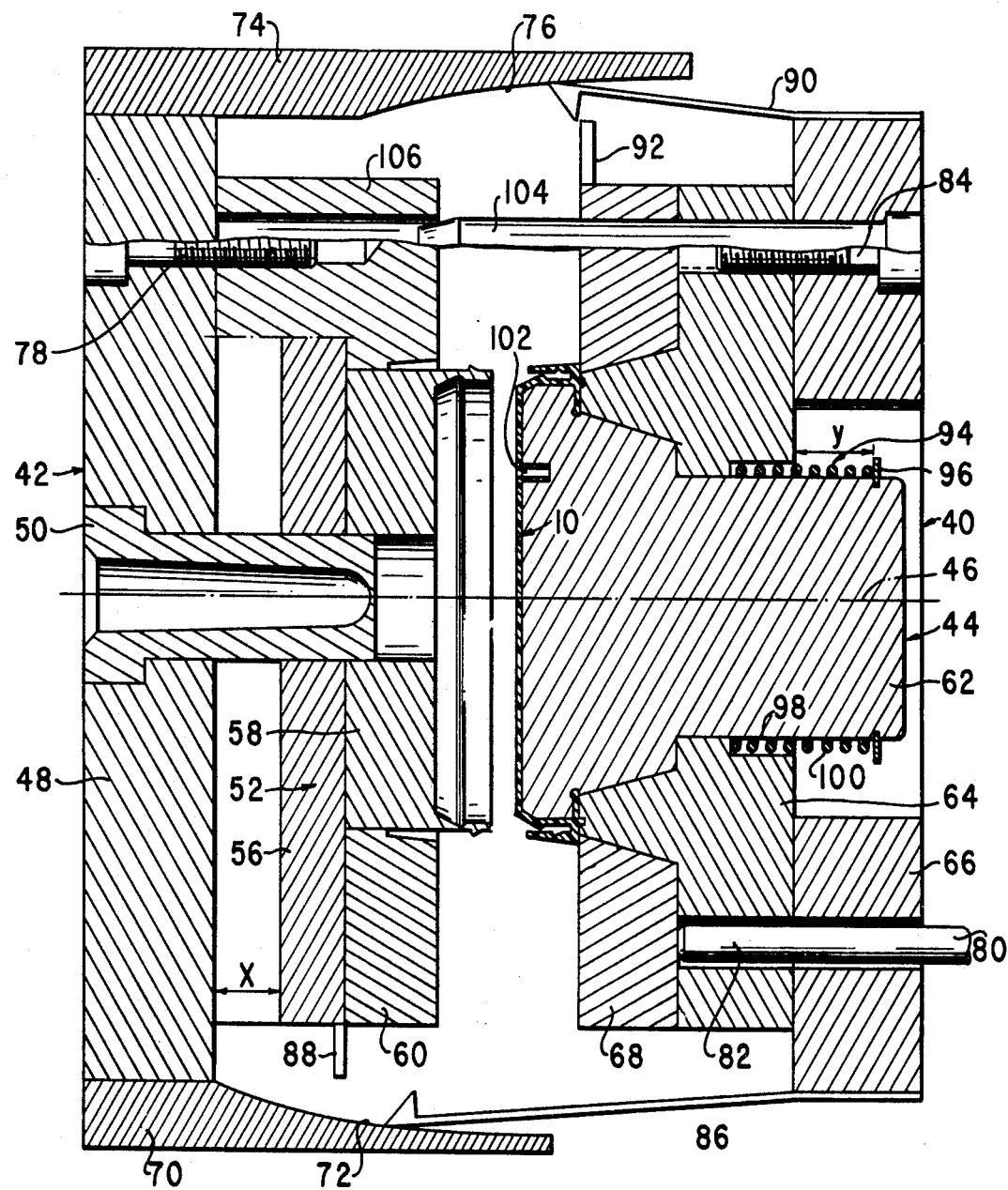
FIG. 6 is a schematic view in cross-section of the molding apparatus of FIG. 4 shown in a second partially opened position.
Figure 7:
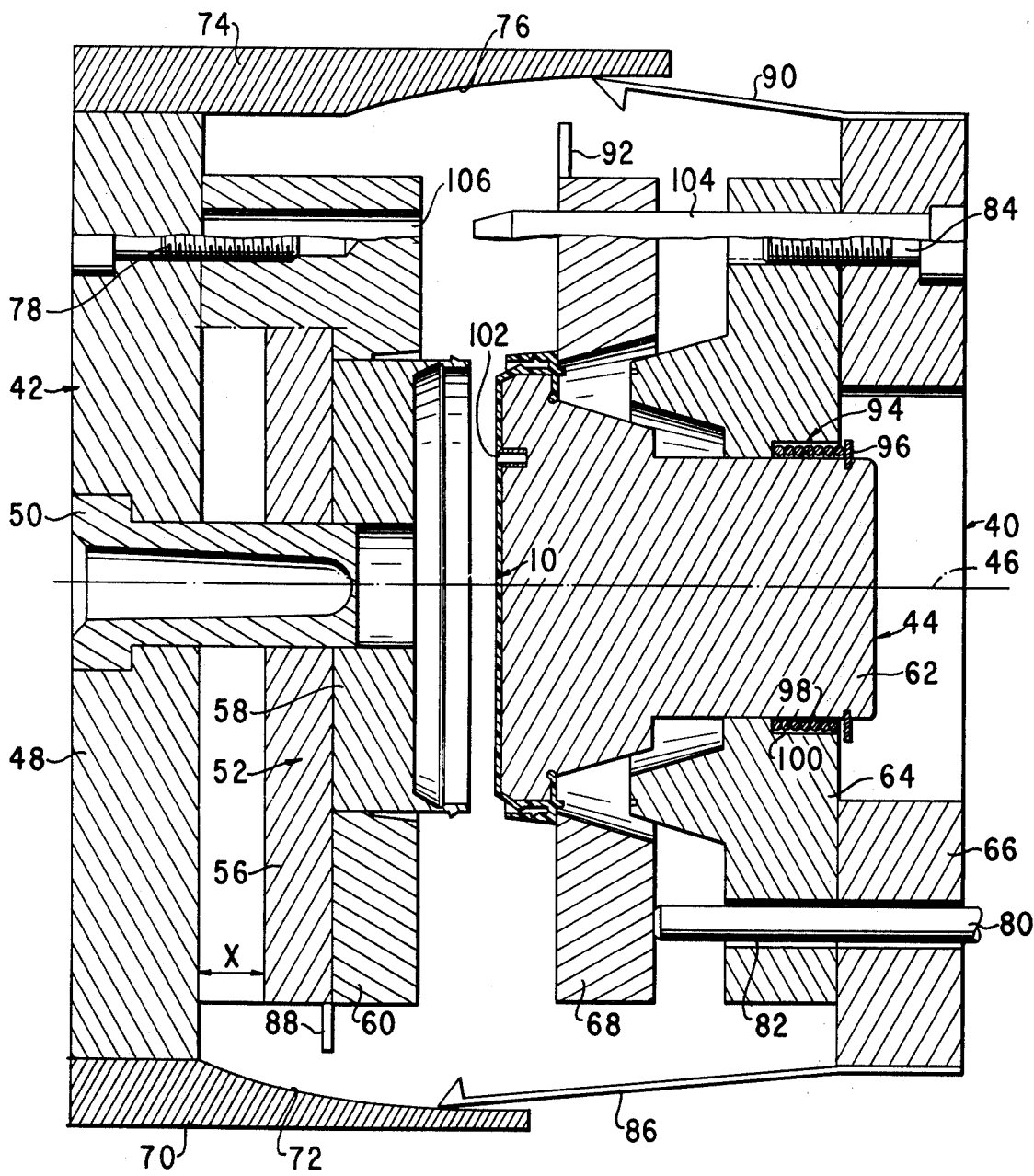
FIG. 7 is a schematic view in cross-section of the molding apparatus of FIG. 4 shown in a third partially opened position.
Figure 8:
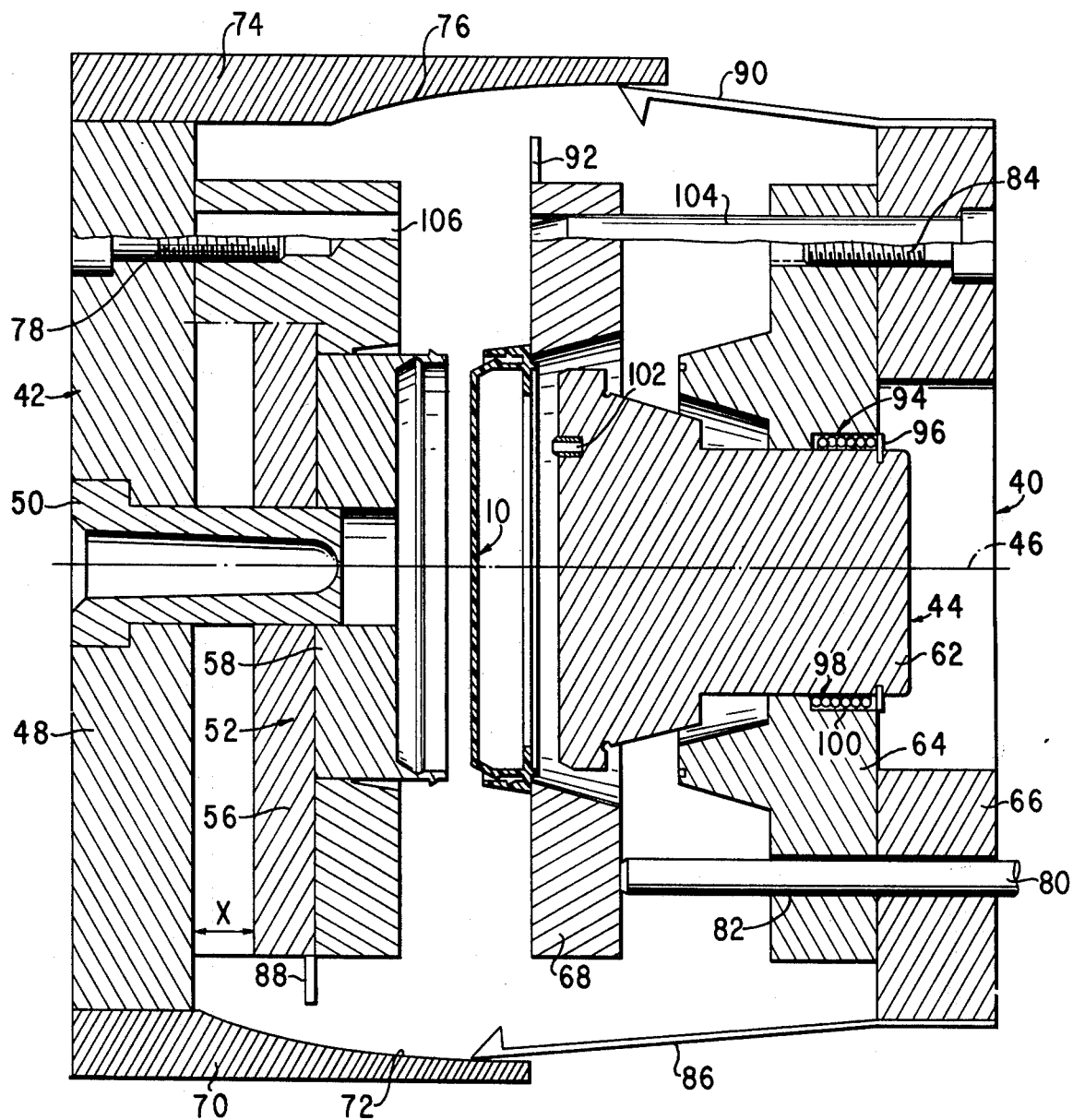
FIG. 8 is a schematic drawing in cross-section of the molding apparatus of FIG. 4 shown in its fully opened position.

FIGS. 4, 5, 6, 7 and 8 illustrate a molding apparatus 40 constructed in accordance with the present invention. FIG. 4 illustrates molding apparatus 40 in its closed position; FIG. 8 illustrates molding apparatus 40 in its opened position and FIGS. 5, 6 and 7 illustrate molding apparatus 40 in various partially opened positions. Molding apparatus 40 includes a stationary die section 42 and a movable die section, shown generally by reference numeral 44, which is adapted to move axially with respect to the longitudinal axis 46 of the cover 10 and molding apparatus 40. The stationary section 42 of molding apparatus 40 includes a mounting plate 48 and an injection nozzle 50 mounted centrally within mounting plate 48 and in axial alignment with longitudinal axis 46.

Movable die section 44 of molding apparatus 40 includes a first movable die member 52 which is generally annular in shape and is disposed concentrically about and in slideable relation with respect to injection nozzle 50. Movable die member 52 engages on one of its sides mounting plate 48. The other side of movable die member 52 is shaped to form a portion of a mold 54 which is in the shape of cover 10. More particularly, movable die member 52 has a molding surface shaped to form a portion of the mold 54 corresponding to a major portion of the bottom surface of the depressed portion 28 of cover 10, as well as the inner surface of the U-shaped rim including inner sidewall 14, yoke 36 and outer sidewall 16. The movable die member 52 is adapted to cooperate with injection nozzle 50 to form the molding surface for mold 54 corresponding to the bottom surface of depressed portion 28 of cover 10. Movable die member 52 includes an annular section 56 of relatively large diameter and an annular section 58 of relatively small diameter which forms the aforementioned molding surface for mold 54.

The stationary die section 42 also includes a matrix plate 60 which is generally annular in shape and is disposed concentrically about section 58 of movable die member 52. Matrix plate 60 has a molding surface shaped to form a portion of the mold 54 corresponding generally to the outer surface of the outer sidewall 16 of cover 10. Section 58 of movable die member 52 is adapted to move axially within the interior of matrix plate 60.

Movable die section 44 also includes a movable die member 62 which has a molding surface shaped to form a portion of the mold 54 corresponding generally to the upper surface of depressed portion 28 of cover 10, the inside surface of inner sidewall 14 of cover 10 and the bottom surface of gripping flap 26 of cover 10. Movable die member 62 is adapted to move axially with respect to longitudinal axis 46 in molding apparatus 40. The molding surface of movable die section 52 is disposed generally opposite from that of section 58 of movable die member 52 and injection nozzle 50.

From the foregoing, it will be seen that in general the stationary section 40 has a stationary member shown as matrix plate 60 which forms the outer surfaces of the sidewalls of the mold. At least one of the plurality of movable die members in apparatus 40 is slidingly engaged within member 60. This movable die member, shown as die member 58, forms adjacent molding surfaces with those of matrix plate 60. The remainder of movable die members can form the complimentary surfaces of the rest of the mold. From the initial closed position, the closed mold is opened by the axial movement of the movable die members so that the stationary die member is first disengaged from the article. Then, the slidingly engaged movable member is disengaged, finally the remainder of movable members are disengaged to release the molded article 10. Thus, in effect the matrix plate shown as 60 and the slidingly engaged movable member 58 form a cavity section having a movable bottom with stationary sidewalls and together with the elements of the movable core form the closed mold.

As shown, the stationary member or matrix plate 60 slidingly engages the movable die member 52. The movable die member 52 slidingly engages the injection nozzle 50. Together this combination provides guide means so that the die members keep their close tolerance during repeated cycles of machine operation. Further matrix plate 60 provides a bearing surface on its forward portion for supporting and for guiding the movable die member 52. In addition, the radially extending portion of element 56 on die member 52 forms a stop means to limit the forward axial travel of 52 during the mold opening. It can be seen that with the matrix plate 60 forming the stationary section of the mold to define the outer surfaces of the molded article, in some applications it may be desirable to provide an injection means by which the hot molten plastic enters the mold through the sidewall rather than through the movable die member 52. It is however, preferred in forming covers having a peripheral inverted U-shaped rim, to have the injection nozzle in the geometric center of the part as shown in the Figures. Furthermore, because of the support offered by the injection nozzle, it is also preferred that the movable die member be slidingly engaged on the injection nozzle. A further advantage of the combination of stationary die member 60 and slidingly engaged movable die member 52 is that mold venting means such as grooves may be formed at the mating surfaces of the intersection of the members so that gases may be released when hot plastic is injected into the empty mold. Preferably these grooves are formed aligned with the axis of the mold in the surfaces of the stationary element such as matrix plate 60.

The die member 58 of the movable member 52 can have, as shown in FIG. 4, portions extending into the cavity defined by the matrix plate 60 and in addition can have portions defining the remainder of the cavity portion of the mold. This is shown in FIG. 4 by those portions of element 58 forming the concave surfaces of the inverted U-shaped rim of the article 10 while matrix plate 60 forms the outer surfaces of this rim. In this manner, member 58 acts as a core mold with respect to the matrix plate 60 and as a cavity mold with respect to the core elements of movable member 62.

A movable die member 64 which is generally annular in shape is disposed concentrically about the central portion of movable die member 62. Movable die member 64 has a molding surface shaped to form a portion of the mold 54 corresponding generally to the inner portion of the upper surface of the yoke 36 as well as upper rim 38 and gripping flap 26 of cover 10. Movable die member 64 is fixedly connected to a mounting plate 66 which is generally annular in shape and disposed concentrically in spaced relationship about the movable die member 62 and is adapted to be movable axially in the molding apparatus 40. As will be seen from the drawings, the portion of movable die member 64 in the region of its molding surface forms an annular necked-down projection which terminates with the molding surface.

The movable die section 42 includes a stripping plate 68 which is generally annular in shape and disposed concentrically about movable die member 64 and adjacent on its inner side to matrix plate 60. Stripping plate 68 has a molding surface shaped to form a portion of the mold 54 corresponding generally to the upper surface of the outer portion of yoke 36.

The stationary section 42 of the molding apparatus 40 also includes a first cam 70 having a camming surface 72 and a second cam 74 having a camming surface 76. In addition, the stationary die section 42 includes a bolt 78 which connects together in fixed relationship mounting plate 48 and matrix plate 60. The stationary die section 42 also includes bolt 80 which is disposed in slidable relationship within bore 82 formed in movable die member 64 and mounting plate 66 and in parallel relationship to longitudinal axis 46. Movable die member 64 is connected together with mounting plate 66 by a screw member 84.

A spring-loaded latch member 86 is fixedly connected at one of its ends to mounting plate 66 and is adapted to engage at its other end pivot 88 fixedly connected to section 56 of movable die member 52. The spring-loaded latch 86 is disposed in generally parallel-spaced relationship to longitudinal axis 46 and is adapted to slide along camming surface 72 of cam 70. A second spring-loaded latch 90 is fixedly connected at one of its ends to mounting plate 66 and is adapted to engage at its other end a pivot 92 fixedly connected to stripping plate 68. The spring-loaded latch 90 is disposed in generally parallel-spaced relationship to longitudinal axis 46 and is adapted to slide along camming surface 76 of cam 74.

A connecting means 94 is operatively disposed between movable die member 62 and movable die member 64. The connecting means 94 includes a ring 96 fixedly connected to the exterior of movable die member 62 and an annular recess 98 in the interior surface of movable die member 64 adjacent the movable die member 62. A spring 100 is mounted between the ring 96 and the recess 98 to provide a spring means urging together the movable die member 62 and movable die member 64. The spring 100 is thus mounted in compression between ring 96 and recess 98.

A spacing bolt 102 is mounted on the molding side of movable die member 52. The proper alignment of the various movable die members of movable die section 44 of molding apparatus 40 is assisted by guide pin 104 which moves in guide bore 106, being in axial alignment with longitudinal axis 46.

The molding apparatus 40 of the present invention operates in the following manner to produce molded plastic cover 10. Prior to commencing the injection of plastic into the mold 54 through injection nozzle 50, the molding apparatus 40 is placed in its closed position as is illustrated in FIG. 4. Spacing bolt 102 provides the desired amount of spacing between the molding surfaces of section 58 of movable die member 52 and the opposing surface of movable die member 62. A suitable plastic in molten form is then introduced through injection nozzle 50 into the interior of mold 54, filling the mold completely with the plastic. Any plastic capable of being molded by injection molding may be utilized in the present invention including polyethylene, polypropylene, etc. After the plastic has been injected into mold 54, it is permitted to harden into a solid state. Preferably the molding apparatus 40 will include a cooling means (not shown) to accelerate the cooling cycle in order to reduce the time of the molding cycle.

Referring now to FIG. 5, the molding apparatus is moved from its closed position shown in FIG. 4 to a first partially opened position shown in FIG. 5 during the first phase of the opening operation of molding apparatus 40. The molding apparatus 40 is moved axially to the right in the figures by any conventional moving means (not shown) such as, for example, a servomotor. During the first phase of the opening of molding apparatus 40, the movable die section 44 moves a predetermined distance indicated as X in FIGS. 4 and 5, as will be seen by comparing FIGS. 4 and 5. The first movable die member 52 is moved a distance X as mounting plate 66 is moved to the right by means of the spring-loaded latch 86 connected thereto, which engages pivot 88 of movable die member 52, and moves axially to the right in the figures bearing against camming surface 72 of cam 70. As a result of this axial movement of first movable die member 52, and particularly section 58 thereof, the movable die section 44 moves the molded cover 10 out of engagement with matrix plate 60 such that the outer surface of molded plastic cover 10 is disengaged from the molding apparatus 40. Additionally, a portion of the bottom surface of molded plastic cover 10 is disengaged from the molding surface of injection nozzle 50 of the molding apparatus 40. Also, at this point, spring-loaded latch 86 disengages pivot 88 of section 56 of first movable die member 52.

Now referring to FIG. 6, the molding apparatus 40 of the present invention is shown in a second partially opened position as it moves through a second opening phase representing the difference between the position of the molding apparatus 40 shown in FIG. 5, as compared with that shown in FIG. 6. In this phase of the opening of molding apparatus 40, the spring-loaded latch 90 connected to mounting plate 66, which engages pivot 92 of stripping plate 68 and moves axially to the right in the figures bearing against camming surface 76 of cam 74, moves the movable die section 44, except for movable die member 52, an additional predetermined distance axially to the right in the figures. Movable die member 52, however, is prevented from moving to the right on account of its engagement with matrix plate 60, which is fixedly connected by bolt 78 to stationary die section 42. With this exception, the other elements of movable die section 44 are moved to the right axially on account of the engagement of spring-loaded latch 90 to pivot 92 connected to stripping plate 68 of molding apparatus 40. As a result of this axial movement of molding apparatus 40 during this second phase of the opening operation, the molded plastic cover 10 is completely disengaged from the movable die member 52 and in particular, section 58 thereof, as can be clearly seen in FIG. 6. At this point, spring-loaded latch 90 becomes disengaged from pivot 92 of stripping plate 68.

Now referring to FIG. 7, the molding apparatus 40 is shown in a third partially opened position as a result of moving through a third opening phase as represented by the differences shown between FIG. 6 and FIG. 7. In moving through this third opening phase, the moving means opening the molding apparatus 40 moves mounting plate 66, which is connected to movable die member 64, to the right in the figures a predetermined distance and axially with respect to the longitudinal axis 46. The movement of molding apparatus 40 during this third opening phase separates or disengages movable die member 64 from movable die member 62. This results from the fact that the stripping plate 68 is prevented from further axial movement to the right in the figures by bolt 80. Then, as a result of this action, the stripping plate 68 which is in contact with molded cover 10 restrains during the phase of the opening operation additional axial movement to the right of movable die member 62. During this third opening phase, as can be observed by comparing FIGS. 6 and 7, the spring means 94 is further compressed between ring 96 and annular recess 98. Thus, during this third phase of the opening operation of molding apparatus 40, the movable die member 64 is disengaged from the molded cover 40, as can be clearly seen by reference to FIG. 7.

Now referring to FIG. 8, the molding apparatus 40 is shown in its fully open position as a result of moving through a fourth opening phase as represented by the change of position of the molding apparatus 40 between FIGS. 7 and 8. During this fourth opening phase, as the moving means moves mounting plate 66 and movable die member 64 connected thereto, the movable die member 62 is moved axially to the right in the figures due to the fact that the inner surface of movable die member 64 bears against ring 96 of movable die member 62. Therefore, as a result of the movement of movable die member 62 axially to the right in the figures, the molded plastic cover 10 is stripped from the molding surface of movable die member 62 by the restraining action on molded plastic cover 10 of the interior surface of stripping plate 68. The fully disengaged plastic cover 10 can be clearly seen by reference to FIG. 8.

After a particular molded plastic cover 10 has been produced in molding apparatus 40 as shown by reference sequentially to FIGS. 4, 5, 6, 7 and 8, and the plastic cover 10 is removed completely from the mold 54, the molding apparatus is then ready for molding another molded plastic cover 10. The molding apparatus 40 is then moved from its open position shown in FIG. 8 to its closed position shown in FIG. 4 by movement thereof in an axial direction to the left in the figures. In the closing of the molding apparatus 40, the various movable die members are moved to the positions shown in FIG. 4 through a sequence of steps as can be readily understood in comparing these members as they move sequentially from their position shown in FIG. 8 to FIG. 7 in a first closing phase, then to the position shown in FIG. 6 as a result of a second closing phase, then to position shown in FIG. 5 as a result of a third closing phase and then finally to the position shown in FIG. 4 as a result of a fourth closing phase of the molding apparatus 40. At this point, then, the molding apparatus 40 is ready for additional molten plastic to be injected into the mold 64 through injection nozzle 50 and to commence again the molding cycle.

The opening movement of molding apparatus 40 is an uninterrupted, smooth, continuous movement (toward the right) whereby the individual die elements sequentially terminate their movement due to simple control devices, but without any interruption of the continuous opening movement of the remaining die elements. In this way, the plastic cover 10 becomes step-by-step freed from the die elements. These steps do in no way cause an an interruption of the opening movement.

In no instance is there any opening movement in a radial direction. This uninterrupted, smooth, continuous opening movement of the die elements is possible due to the special design of the plastic cover and to the special design of the die elements.

Since various elements of the die molds are interconnected to each other for movement, only one connection to an outside force is necessary. Further, the termination of the axial movement is controlled by the die elements themselves via simple interconnecting control members.

Therefore, there is no need for an external control mechanism and associated control elements, especially not for radial linear or circular opening movements. Thus, the opening, as well as the closing movement, is done in a faster and simpler manner.

Thus, it will be seen that the die mold assembly consists of a stationary part and a moving part, the latter consisting of several axially movable die elements and secondly, that with the first movement (phase) an outer surface becomes removed out of the die establishing a first clearance in a radial direction. After this initial phase any movement for achieving a further clearance in radial direction is made by the plastic cover itself. This is due to the fact that during the first phase no parts projecting radially inward or outward must be freed, which is a key feature of the present design.

While the foregoing describes a specific embodiment of the present invention, it will be understood that the present invention is subject to various modifications within the capabilities of persons skilled in the art. Thus, the present invention can be practiced with a variety of designs without departing from the spirit and scope of the appended claims. For example, while the present invention has been described with respect to a single cavity mold, it is to be clearly understood that the present invention could advantageously be practiced with a multi-cavity mold to thereby increase the capacity of the molding apparatus as would readily be understood by one skilled in the art. Further, for example, the present apparatus and method can be utilized to mold covers which are rectangular, as well as circular, in radial cross-section.

What is claimed is:

1. In a relatively flexible one-piece molded plastic cover for an open mouthed container, wherein said container has a circumferential extending projection on its outer wall in the region of the edge of said container, wherein said cover has an inverted U-shaped rim in the form of a pair of upstanding circumferential sidewalls, and wherein the outer sidewall of said cover has a circumferential weakening line which subdivides the cover into a first cover member reusable as a cover and a second cover member being a tear-off end portion, the improvement comprising means for providing firm clamping and contact pressure between the upper edge of said container and the sidewalls of said cover by having the inner sidewall of said cover with a circumferential extending bulged portion to maintain pressure contact with the inner wall of said container, said bulged portion being disposed approximately on the level of said projection, and having the outer sidewall of said cover shaped to engage the edge of said container firmly above said projection, and a recess in said outer sidewall of said cover shaped to form said weakening line and to engage the projection on said container for locking said cover to said container, the outer surface of said outer sidewall being substantially straight line in cross-section.

2. A product according to claim 1 wherein said outer surface of said outer sidewall is tapered inwardly from top to bottom.

3. A product according to claim 1 wherein said cover is provided with a gripping flap adapted to assist in removing said cover from a container.

4. In a relatively flexible one-piece molded plastic cover for an open mouthed container, wherein said container has a circumferential extending projection on its outer wall in the region of the edge of said container, wherein said cover has an inverted U-shaped rim in the form of a pair of upstanding circumferential sidewalls, and wherein the outer sidewall of said cover has a circumferential weakening line which subdivides the cover into a first cover member reusable as a cover and a second cover member being a tear-off end portion, the improvement comprising means for providing relatively firm clamping and contact pressure between the upper edge of said container and the sidewalls of said cover by having the inner sidewall of said cover adapted when engaging the edge of said container to provide a circumferential extending bulged portion to maintain pressure contact with the inner wall of said container, said bulged portion being disposed approximately on the level of said projection, and having the outer sidewall of said cover shaped to engage the edge of said container relatively firmly above said projection, and a recess in said outer sidewall of said cover shaped to form said weakening line and to engage the projection on said container for locking said cover to said container, the outer surface of said outer sidewall being substantially straight line in cross-section.

5. A product according to claim 4 wherein said outer surface of said outer sidewall is tapered inwardly from top to bottom.

6. A product according to claim 4 wherein said cover is provided with a gripping flap adapted to assist in removing said cover from a container.

7. In the combination of an open mouthed container and a relatively flexible one-piece molded plastic cover therefor, wherein said container has a circumferential extending projection on its outer wall in the region of the edge of said container, wherein said cover has a depressed central portion and an inverted U-shaped rim in the form of a pair of upstanding circumferential sidewalls, and wherein the outer sidewall of said cover has a circumferential weakening line which subdivides the cover into a first cover member reusable as a cover and a second cover member being a tear-off end portion, the improvement comprising means for providing relatively firm clamping and contact pressure between the upper edge of said container and the sidewalls of said cover by having the inner sidewall of said cover adapted when engaging the edge of said container to provide a circumferential extending bulged portion to maintain pressure contact with the inner wall of said container, said bulged portion being disposed approximately on the level of said projection, and having the outer sidewall of said cover shaped to engage the edge of said container relatively firmly above said projections, and a recess in said outer sidewall of said cover shaped to form said weakening line and to engage the projection on said container for locking said cover to said container, the outer surface of said outer sidewall being substantially straight line in cross-section.

8. A product according to claim 7 wherein said outer surface of said outer sidewall is tapered inwardly from top to bottom.

9. A product according to claim 7 wherein said cover is provided with a gripping flap adapted to assist in removing said cover from a container.

10. A product according to claim 7 wherein at least a part of said bulged portion is disposed at a level closer to said depressed central portion of said cover than to the upper edge of said container when said cover engages said upper edge of said container.

* * * * *